(No Model.)

D. PARRY.
DRIVE CHAIN.

No. 593,685. Patented Nov. 16, 1897.

Witnesses

Inventor
Denis Parry

UNITED STATES PATENT OFFICE.

DENIS PARRY, OF LONDON, ENGLAND.

DRIVE-CHAIN.

SPECIFICATION forming part of Letters Patent No. 593,685, dated November 16, 1897.

Application filed June 30, 1897. Serial No. 643,027. (No model.)

*To all whom it may concern:*

Be it known that I, DENIS PARRY, a subject of the Queen of Great Britain, residing at Herne Hill, London, in the county of Surrey, England, have invented a certain new and useful Improvement in Driving-Chains, of which the following is a specification.

My invention relates to a certain new and useful improvement in driving-chains, the class of chains for which the invention is adapted being more particularly those of small size, such as may be used for driving cycles and other small work, though the invention is adapted to chains of all sizes, the object of the invention being more particularly to enable a chain to be made of a smaller size than hitherto for the work which it is required to do, while possessing the same amount of strength.

In the accompanying drawings are illustrated some forms of chain constructed according to my invention.

Figure 1:
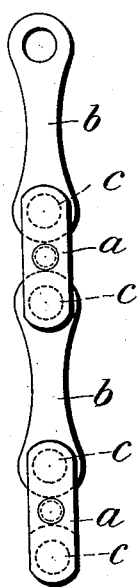
Figure 2:
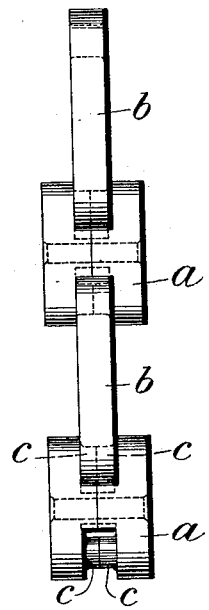
Figure 3:
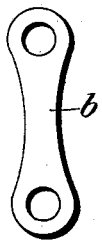
Figure 4:
Figures 5, 6:
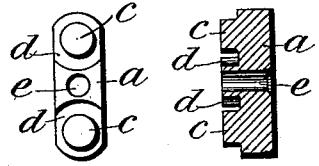

Figure 1 is a side elevation of a short length of chain. Fig. 2 is a front or back elevation, both being identical. Fig. 3 is a side view of a detached solid link. Fig. 4 is a section through Fig. 3 at right angles to same. Fig. 5 is an elevation of one half of the divided link, hereinafter described. Fig. 6 is a section through Fig. 5 at right angles to same.

The chain shown consists of divided links $a$, which connect together solid links $b$ or which may connect links of any other form which have ends suitably formed for engaging with the divided links.

It is customary in chains of this class to use for the connecting-link, such as $a$, in whatever form it may be made, separate pins, which form the pivot to which the succeeding link is attached, and this construction necessitates leaving a considerable thickness of metal around the opening in the links in which the pin is secured, so that the connecting-link has thereby to be of considerable size.

In producing a connecting-link, such as $a$, according to my invention I form same in halves or parts, as shown in Fig. 2, Figs. 5 and 6 being detail views of one half or part, and machine out parts at each end of same, so as to leave studs $c$, which are thus formed out of the solid metal, so that there is no necessity for providing a quantity of metal around same on the body of the link to take the strain. In the form of link shown in these figures the method of production is as follows:

Each part or half of the link $a$ has formed in it at each end recesses or gaps $d$, such recesses being machined out or otherwise produced, so that a stud or pivot-pin $c$ is formed, the recesses or gaps being of sufficient size to admit of one half part of the links, such as $b$, working on the studs or pivots. In machining or producing these studs or pivots the center part of each half or part of the link is left untouched, and through this portion a hole $e$ is drilled or formed for a pin or rivet, which is subsequently passed through two of these parts and rivets or secures them together. It will be understood that when the two halves or parts are placed together with a link, such as $b$, between, the studs or pivot-pins $c$ of each will abut and form what is practically a solid pin, on which the link $b$ will pivot.

To open the chain, it is only necessary to drive out the pin occupying the central hole $e$, when the parts of the link $a$ may be separated. The divided link $a$ may be of the section shown, which, together with the section of link $b$, will enable the chain to be used on either side.

It will be understood that a driving or sprocket wheel intended to engage with this chain must have a pair of teeth or sprockets side by side, so as to embrace the solid link $b$, or must be formed with a suitable recess to receive said solid link, as a wheel having single sprockets arranged in the same plane is not well suited for driving same.

What I claim is—

In a driving-chain and in combination, a divided link composed of parts, each part having a stud at either end formed out of the solid metal and projecting inwardly and a recessed portion entirely around each stud, a hole for a pin through the body portions, the latter and the ends of the studs being flush so that they are adapted to abut against the corresponding portions of the other part when the two are secured together, and a solid link having a hole at either end adapted to receive a stud of each part of the divided link, substantially as described.

In testimony whereof I have hereunto set my hand in the presence of two subscribing witnesses.

DENIS PARRY.

Witnesses:
  ALLEN PARRY JONES.
  JOSEPH LAKE.